W. M. MOORE.
NUT LOCK.
APPLICATION FILED SEPT. 20, 1917.
1,276,097.
Patented Aug. 20, 1918.
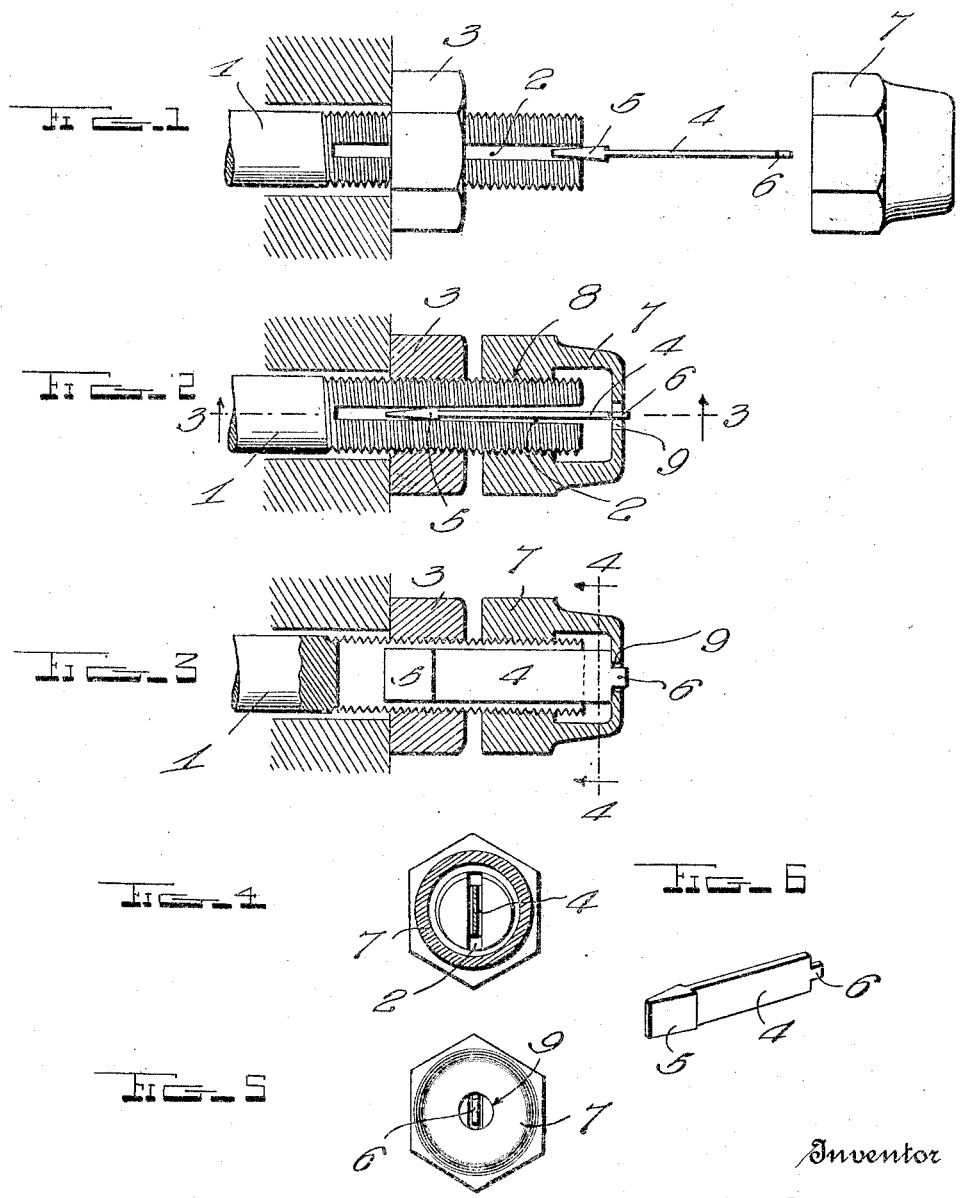
Witness
Inventor
W. M. Moore
By
Attorneys

UNITED STATES PATENT OFFICE.

WILLIAM M. MOORE, OF NEWARK, OHIO.

NUT-LOCK.

1,276,097.   Specification of Letters Patent.   Patented Aug. 20, 1918.

Application filed September 20, 1917. Serial No. 192,369.

*To all whom it may concern:*

Be it known that I, WILLIAM M. MOORE, a citizen of the United States, residing at Newark, in the county of Licking and State of Ohio, have invented certain new and useful Improvements in Nut-Locks; and I do declare the following to be a full, clear, and exact description of the invention, such as will enable others skilled in the art to which it appertains to make and use the same.

This invention relates to certain new and useful improvements in nut locks.

The principal object of the invention is to generally improve upon devices for coupling nuts to bolts by the provision of an extremely strong, durable and inexpensive construction, one which will be efficient and reliable in operation, and well adapted to the purpose for which it is designed.

With this and numerous other objects in view, the invention consists of certain novel features of construction, and the combination and arrangement of parts as will be hereinafter fully described and claimed.

In the accompanying drawings forming a part of the application and in which similar reference characters are used to designate like parts throughout the several views:

Figure 1 is a side elevation of a nut threaded upon a bolt, and a locking device constructed in accordance with this invention ready to be placed in operative position upon these parts;

Fig. 2 is a longitudinal sectional view through the nut, bolt, and locking device, the latter being disposed in its operative position;

Fig. 3 is a longitudinal sectional view taken substantially on the plane indicated by the line 3—3 of Fig. 4;

Fig. 4 is a transverse sectional view taken on the plane indicated by the line 4—4 of Fig. 3;

Fig. 5 is an end view of the locking device; and,

Fig. 6 is a detail perspective view of the wedge member.

Referring more particularly to the drawings, the numeral 1 designates a bolt which is constructed the same as any ordinary bolt with the exception that its threaded end is provided with a longitudinally extending slot 2, and 3 designates a nut device to be threaded upon the bolt. The nut 3 is constructed identically with those now on the market and needs no special adaptation when used in connection with the locking device now to be described.

The above mentioned locking device consists of a wedge member, which is preferably formed of a flat bar 4 having an enlarged wedge shaped head 5 at its front end, and a reduced lug 6 at its rear end. The slot 2 in the bolt 1 is preferably slightly less in thickness than the thickness of the thickest portion of the head 5 of the wedge member so that when the latter is inserted in the slot, the bifurcated portion of the bolt will be forced into tight frictional contact with the opening through the nut and thus the latter will be prevented from turning upon the same.

Associated with the wedge member is a cap member, which is here designated by the numeral 7, and which is internally threaded as at 8 for connection to the end of the bolt. The internal diameter of the threaded portion of the cap member 7 is preferably slightly larger than the internal diameter of the nut 3 so that no difficulty will be experienced in threading the cap member upon the bolt, which might otherwise be met with owing to the fact that the head 5 of the wedge member travels in advance of the cap member and acts to spread the bifurcated portion of the bolt farther apart than before. The end of the cap member 7 is provided with an opening 9, and through this opening extends the reduced lug 6 carried at the rear end of the wedge member.

In using the device the nut 3 is first threaded upon the bolt 1, and the head of the wedge is inserted in the slot 2 of the same. The cap member 7 is then positioned so that the lug 6 extends through the opening 9 in its end, and the wedge member and cap member are then driven until the cap member reaches the end of the bolt. The cap member is then turned so as to thread it upon the bolt, the wedge member having its rear end bearing against the inner face of the end of the cap member and being driven toward the inner end of the slot 2 after the cap member is threaded. Should there be a tendency of the wedge member to prevent engagement of the threads of the cap with those of the bolt, then the lug 6, which extends a slight distance beyond the outer side of the end of the cap member may be struck sharply one or two times so as to prevent such interference of the wedge member.

From the foregoing description taken in connection with the accompanying drawings, the construction use and operation of the device will be readily understood without a more extended explanation.

As various changes in form, proportion and in the minor details of construction may be resorted to without departing from the spirit of this invention it is to be understood that I do not wish to be limited to the construction herein shown and described other than as claimed.

I claim:

The combination with a bifurcated bolt and a nut threaded upon the bolt; of a bar having a wedge shape head at one end and a relatively narrow lug at its other end; said wedge shape head being thicker than the remaining portion of the bar and thicker than the primary distance between the furcations of said bolt, said bar being disposed between said furcations so that its head spreads said furcations apart but allows their ends to be drawn toward one another; and a cap member threaded so as to engage the spreading furcations of said bolt, said cap having an opening of a size to permit the reception of the body of said bar but being capable of receiving said lug, said lug extending through and beyond said opening for receiving the impact of a driving tool.

In testimony whereof I have hereunto set my hand in the presence of two subscribing witnesses.

WILLIAM M. MOORE.

Witnesses:
J. LAWRENCE JONES,
MINNIE HENLEY.

Copies of this patent may be obtained for five cents each, by addressing the "Commissioner of Patents, Washington, D. C."